US012446615B2

(12) United States Patent
Black et al.

(10) Patent No.: US 12,446,615 B2
(45) Date of Patent: Oct. 21, 2025

(54) AEROSOL GENERATING ARTICLE AND A METHOD FOR MANUFACTURING AN AEROSOL GENERATING ARTICLE

(71) Applicant: JT International S.A., Geneva (CH)

(72) Inventors: Paul Black, Schweich (DE); Andrew Robert John Rogan, Forres (GB); Oleksandr Zhurba, Trier (DE)

(73) Assignee: JT International SA (CH)

(*) Notice: Subject to any disclaimer, the term of this patent is extended or adjusted under 35 U.S.C. 154(b) by 737 days.

(21) Appl. No.: 17/279,217

(22) PCT Filed: Nov. 25, 2019

(86) PCT No.: PCT/EP2019/082359
§ 371 (c)(1),
(2) Date: Mar. 24, 2021

(87) PCT Pub. No.: WO2020/109203
PCT Pub. Date: Jun. 4, 2020

(65) Prior Publication Data

US 2022/0015413 A1 Jan. 20, 2022

(30) Foreign Application Priority Data

Nov. 29, 2018 (EP) .................................... 18209126
Nov. 29, 2018 (EP) .................................... 18209147
(Continued)

(51) Int. Cl.
*A24D 1/20* (2020.01)
*A24C 5/01* (2020.01)
(Continued)

(52) U.S. Cl.
CPC .................. *A24D 1/20* (2020.01); *A24C 5/01* (2020.01); *A24F 40/20* (2020.01); *A24F 40/465* (2020.01); *H05B 3/22* (2013.01)

(58) Field of Classification Search
None
See application file for complete search history.

(56) References Cited

U.S. PATENT DOCUMENTS 4,889,143 A 12/1989 Pryor et al.
6,213,128 B1 4/2001 Smith et al.
(Continued)

FOREIGN PATENT DOCUMENTS

CN 108135266 A 6/2018
CN 108135277 A 6/2018
(Continued)

OTHER PUBLICATIONS

International Search Report for Application No. PCT/EP2019/082359, Dated Feb. 19, 2020, 3 pages.
(Continued)

*Primary Examiner* — Philip Y Louie
*Assistant Examiner* — Jeffrey A. Buckman
(74) *Attorney, Agent, or Firm* — Lerner David LLP

(57) ABSTRACT

An aerosol generating article comprises an aerosol generating material part and an inductively heatable susceptor positioned in a shell. The aerosol generating material part comprises at least ten aerosol generating strips substantially oriented in a first direction and the inductively heatable susceptor is positioned between the aerosol generating strips and comprises an elongate part which is substantially oriented in the first direction. Methods for manufacturing the aerosol generating article are also described.

20 Claims, 7 Drawing Sheets

(30) Foreign Application Priority Data

| | | | |
|---|---|---|---|
| Dec. 10, 2018 | (EP) | ..................................... | 18211375 |
| Feb. 21, 2019 | (EP) | ..................................... | 19158423 |

(51) Int. Cl.

| | |
|---|---|
| ***A24F 40/20*** | (2020.01) |
| ***A24F 40/465*** | (2020.01) |
| ***H05B 3/22*** | (2006.01) |

(56) References Cited

U.S. PATENT DOCUMENTS

| | | | | |
|---|---|---|---|---|
| 2017/0086508 | A1 | 3/2017 | Mironov et al. | |
| 2018/0000157 | A1* | 1/2018 | Batista .................... | A24F 40/40 |
| 2018/0303151 | A1 | 10/2018 | Klipfel | |
| 2018/0310622 | A1 | 11/2018 | Mironov et al. | |
| 2019/0053535 | A1* | 2/2019 | Apetrei Birza ...... | A24B 15/167 |
| 2019/0124981 | A1 | 5/2019 | Fursa | |
| 2020/0253274 | A1* | 8/2020 | Reevell ................... | A24F 40/40 |
| 2020/0375255 | A1* | 12/2020 | Courbat ................ | A24F 40/465 |

FOREIGN PATENT DOCUMENTS

| | | | |
|---|---|---|---|
| CN | 108882752 | A | 11/2018 |
| EP | 3075266 | A1 | 10/2016 |
| IN | 201617028159 | | 1/2017 |
| JP | S62272962 | A | 11/1987 |
| JP | 2012513750 | A | 6/2012 |
| JP | 2015503335 | A | 2/2015 |
| JP | 2016502403 | A | 1/2016 |
| JP | 2018515113 | A | 6/2018 |
| JP | 2018530311 | A | 10/2018 |
| KR | 20180036764 | A | 4/2018 |
| KR | 20180072758 | A | 6/2018 |
| WO | 2010073122 | A1 | 7/2010 |
| WO | 2013098405 | A2 | 7/2013 |
| WO | 2015176898 | A1 | 11/2015 |
| WO | 2015177294 | A1 | 11/2015 |
| WO | 2016184929 | A1 | 11/2016 |
| WO | 2017036954 | A1 | 3/2017 |
| WO | 2017068091 | A1 | 4/2017 |
| WO | 2017068096 | A1 | 4/2017 |
| WO | 2017068098 | A1 | 4/2017 |
| WO | 2018/122320 | A1 | 7/2018 |
| WO | 2018162514 | A1 | 9/2018 |

OTHER PUBLICATIONS

Search Report completed Apr. 23, 23 from Office Action for Taiwanese Application No. 108143655 mailed Apr. 25, 2023. 1 pg.

Search Report dated Jun. 26, 2023 from the Office Action for Chinese Application No. 201980077035.6 issued Jun. 29, 2023, pp. 1-3.

Communication pursuant to Article 94(3) EPC for Application No. 19805985.9, dated Feb. 27, 2025, pp. 1-6.

* cited by examiner

AEROSOL GENERATING ARTICLE AND A METHOD FOR MANUFACTURING AN AEROSOL GENERATING ARTICLE

CROSS-REFERENCE TO RELATED APPLICATIONS

The present application is a national phase entry under 35 U.S.C. § 371 of International Application No. PCT/EP2019/082359, filed Nov. 25, 2019, published in English, which claims priority to European Application No. 18209126.4 filed Nov. 29, 2018, European Application No. 18209147.0 filed Nov. 29, 2018, European Application No. 18211375.3 filed Dec. 10, 2018, and European Application No. 19158423.4 filed Feb. 21, 2019, the disclosures of which are incorporated herein by reference.

TECHNICAL FIELD

The present disclosure relates generally to an aerosol generating article, and more particularly to an aerosol generating article for use with an aerosol generating device for heating the aerosol generating article to generate an aerosol for inhalation by a user. Embodiments of the present disclosure also relate to a method for manufacturing an aerosol generating article

TECHNICAL BACKGROUND

Devices which heat, rather than burn, an aerosol generating material to produce an aerosol for inhalation have become popular with consumers in recent years.

Such devices can use one of a number of different approaches to provide heat to the aerosol generating material. One such approach is to provide an aerosol generating device which employs an induction heating system and into which an aerosol generating article, comprising aerosol generating material, can be removably inserted by a user. In such a device, an induction coil is provided with the device and an inductively heatable susceptor is provided with the aerosol generating article. Electrical energy is provided to the induction coil when a user activates the device which in turn generates an alternating electromagnetic field. The susceptor couples with the electromagnetic field and generates heat which is transferred, for example by conduction, to the aerosol generating material and an aerosol is generated as the aerosol generating material is heated.

The characteristics of the aerosol generated by the aerosol generating device are dependent upon a number of factors, including the construction of the aerosol generating article used with the aerosol generating device. There is, therefore, a desire to provide an aerosol generating article which enables the characteristics of the aerosol generated during use of the article to be optimised. There is also a general desire to provide an aerosol generating article which can be mass-produced easily and consistently.

SUMMARY OF THE DISCLOSURE

According to a first aspect of the present disclosure, there is provided an aerosol generating article comprising:

- a shell;
- an aerosol generating material part and an inductively heatable susceptor positioned in the shell, wherein:
- the aerosol generating material part comprises at least ten aerosol generating strips substantially oriented in a first direction; and
- the inductively heatable susceptor is positioned between the aerosol generating strips and comprises an elongate part which is substantially oriented in the first direction.

The aerosol generating article is for use with an aerosol generating device for heating the aerosol generating strips within the aerosol generating material part, without burning the aerosol generating strips, to volatise at least one component of the aerosol generating strips and thereby generate a heated vapour which cools and condenses to form an aerosol for inhalation by a user of the aerosol generating device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms ‘aerosol’ and ‘vapour’ may be used interchangeably in this specification, particularly with regard to the form of the inhalable medium that is generated for inhalation by a user.

Aerosol generating articles according to the present disclosure can be manufactured efficiently, and mass produced with relative ease, by positioning the aerosol generating strips and the inductively heatable susceptor in the shell. The shell substantially comprises a material that allows an electromagnetic field to pass therethrough and that does not act as an electromagnetic shield. The shell may, for example, comprise a paper wrapper or alternatively a tube or a cup comprising paper or a plastics material, e.g. a heat-resistant plastics material such as polyether ether ketone (PEEK).

A uniform airflow through the aerosol generating article is achieved by virtue of an air flow route provided by gaps between the aerosol generating strips.

The aerosol generating article may comprise at least 20 of said aerosol generating strips, possibly at least 40 of said aerosol generating strips, possibly at least 50 of said aerosol generating strips, or possibly at least 60 of said aerosol generating strips. The aerosol generating article may comprise up to 100 of said aerosol generating strips, possibly up to 150 of said aerosol generating strips, or possibly up to 200 of said aerosol generating strips. A greater number of aerosol generating strips tends to result in the presence of more gaps between the aerosol generating strips and may, therefore, advantageously provide a more uniform airflow through the aerosol generating article. An excessive number of aerosol generating strips is, however, undesirable because it is typically necessary to reduce the width of the aerosol generating strips as the number of strips increases to ensure that the aerosol generating article has appropriate dimensions. If the width of the aerosol generating strips is too low, the strength of the strips may be reduced and, consequently, mass production of aerosol generating articles may become difficult.

The inductively heatable susceptor may be strip-shaped and may be substantially oriented in the first direction. The use of a strip-shaped inductively heatable susceptor may maximise heat transfer from the susceptor to the aerosol generating strips. Furthermore, by orienting the strip-shaped susceptor substantially in the first direction, manufacture of the aerosol generating article may be facilitated.

The inductively heatable susceptor may alternatively be U-shaped, may be I-shaped or pin-shaped or may be tubular, for example with a circular, rectangular or square cross-section.

The aerosol generating material part may be rod-shaped, the shell may comprise a substantially tubular wrapper, and the rod-shaped aerosol generating material part and the inductively heatable susceptor may be enclosed by the substantially tubular wrapper. The aerosol generating article is easy to manufacture due to its shape. The shape may also facilitate storage/packaging of multiple aerosol generating articles, handling of the article by a user, and insertion of the article into a cavity of an aerosol generating device.

One or both ends of each of the inductively heatable susceptor, the rod-shaped aerosol generating material part and the tubular wrapper may be substantially aligned in the longitudinal direction. Such an arrangement may facilitate manufacture of the aerosol generating article and may optimise air flow through the aerosol generating article since the air only comes from the edge of a bundle of aerosol generating strips and goes out from the opposite edge of the bundle thereof.

In one embodiment, the aerosol generating strips, the strip-shaped inductively heatable susceptor and the shell may be substantially the same length. For example, the aerosol generating strips, the strip-shaped inductively heatable susceptor and the tubular wrapper may be substantially the same length. Such an arrangement ensures that there is a uniform distribution of the aerosol generating strips within the shell or tubular wrapper in the longitudinal direction, thereby ensuring that a uniform air flow and uniform heating (since the density of strips is uniform in the first direction) through the aerosol generating article is achieved. In addition, this configuration prevents the aerosol generating strips from dropping out of the tubular wrapper.

In another embodiment, at least some of the aerosol generating strips have a length which is less than the length of the shell. For example, at least some of the aerosol generating strips have a length which is less than the length of the tubular wrapper. Such an arrangement may facilitate manufacture of the aerosol generating article. In addition, the edge of the aerosol generating strips is exposed in the air flow in the shell, such that an aerosol may be generated more effectively.

The aerosol generating article may comprise at least two strip-shaped inductively heatable susceptors. The use of multiple strip-shaped susceptors provides more uniform and effective heating of the aerosol generating strips because the strip-shaped susceptors are at different positions within the shell.

A major face of each of the at least two strip-shaped susceptors may be substantially oriented in a second direction which may be substantially orthogonal to the first direction. Such an arrangement may allow the strip-shaped susceptors to more effectively couple with the electromagnetic field generated by the induction coil of an aerosol generating device and, therefore, to be heated more effectively.

At least one of said aerosol generating strips may be positioned between the at least two strip-shaped susceptors. The strip-shaped susceptors are more effectively heated because they do not contact each other.

The at least two strip-shaped susceptors may be surrounded by the aerosol generating strips. Such an arrangement provides for optimum heating and, hence, optimum aerosol generation because all of the heat generated in the strip-shaped susceptors is transferred to the aerosol generating strips.

The aerosol generating strips may be foldless, in particular in the first direction. The absence of folds, especially in the first direction, allows the density of the aerosol generating strips in the shell to be maximised and made uniform, and ensures that a uniform airflow is achieved.

The strip-shaped inductively heatable susceptor may be foldless, in particular in the first direction. The absence of folds, especially in the first direction, provides uniform heating of the aerosol generating strips due to uniform strip resistance, thereby avoiding heat concentration (or hot spots) which could arise in the presence of folds.

The aerosol generating article may be substantially cylindrical and may include a formation to facilitate circumferential positioning of the aerosol generating article in an aerosol generating device. The formation may, for example, comprise a projection or a recess, such as a groove, on the outer surface of the aerosol generating article. The formation advantageously facilitates positioning of the aerosol generating article in an aerosol generating device in an orientation in which the inductively heatable susceptor is optimally positioned with respect to the electromagnetic field generated by the induction coil of the aerosol generating device.

The aerosol generating article may include a filter, for example comprising cellulose acetate fibres.

The aerosol generating article may include a vapour cooling region. The vapour cooling region may advantageously allow the heated vapour generated by heating the aerosol generating strips to cool and condense to form an aerosol with suitable characteristics for inhalation by a user, for example through the filter. The vapour cooling region may comprise a hollow chamber. The hollow chamber may include a heat absorbing material arranged to absorb heat from the heated vapour to cause it to cool and condense. The heat absorbing material may comprise a metal, for example aluminium.

The aerosol generating article may have a diameter between 4.0 mm and 10.0 mm. The diameter may be between 5.0 mm and 9.0 mm and may possibly be between 6.0 mm and 7.5 mm.

The aerosol generating strips may have a width between 0.2 mm and 10.0 mm. The width may be between 0.2 mm and 7.0 mm, possibly between 0.2 mm and 5.0 mm, possibly between 0.2 mm and 3.0 mm, or possibly between 0.2 mm and 2.0 mm.

The aerosol generating strips may have a thickness between 0.05 mm and 0.7 mm. The thickness may be between 0.05 mm and 0.5 mm, or possibly between 0.05 mm and 0.3 mm.

The aerosol generating strips may have a tensile strength from 200 to 900 N/m. The tensile strength may be from 300 to 800 N/m and may possibly be from 400 to 700 N/m. This helps to ensure that the aerosol generating strips do not break during manufacture of the aerosol generating article.

The aerosol generating strips may comprise plant derived material and in particular, may comprise tobacco. The aerosol generating strips may, for example, comprise reconstituted tobacco including tobacco and any one or more of cellulose fibres, tobacco stalk fibres and inorganic fillers such as $CaCO_3$. The aerosol generating strips may comprise extruded strips and may, for example, comprise an extruded aerosol generating material such as tobacco or reconstituted tobacco.

The aerosol generating strips may comprise an aerosol-former. Examples of aerosol-formers include polyhydric alcohols and mixtures thereof such as glycerine or propylene glycol. Typically, the aerosol generating strips may comprise an aerosol-former content of between approximately 5% and approximately 50% on a dry weight basis. In some embodiments, the aerosol generating strips may comprise an aerosol-former content of between approximately 10% and approximately 20% on a dry weight basis, and possibly approximately 15% on a dry weight basis.

The inductively heatable susceptor may comprise one or more, but not limited, of aluminium, iron, nickel, stainless steel and alloys thereof, e.g. Nickel Chromium or Nickel Copper. With the application of an electromagnetic field in its vicinity, the susceptor may generate heat due to eddy currents and magnetic hysteresis losses resulting in a conversion of energy from electromagnetic to heat.

The induction coil of the aerosol generating device may comprise a Litz wire or a Litz cable. It will, however, be understood that other materials could be used. The induction coil may be substantially helical in shape and may, for example, extend around the cavity in which the aerosol generating article is positioned.

The circular cross-section of a helical induction coil may facilitate the insertion of the aerosol generating article into the aerosol generating device, for example into the cavity in which the aerosol generating article is received in use, and may ensure uniform heating of the aerosol generating strips.

The induction coil may be arranged to operate in use with a fluctuating electromagnetic field having a magnetic flux density of between approximately 20 mT and approximately 2.0 T at the point of highest concentration.

The aerosol generating device may include a power source and circuitry which may be configured to operate at a high frequency. The power source and circuitry may be configured to operate at a frequency of between approximately 80 kHz and 500 kHz, possibly between approximately 150 kHz and 250 kHz, and possibly at approximately 200 kHz. The power source and circuitry could be configured to operate at a higher frequency, for example in the MHz range, depending on the type of inductively heatable susceptor that is used.

According to a second aspect of the present disclosure, there is provided a method for continuously manufacturing an aerosol generating article as defined above, the method comprising:

(i) supplying at least ten aerosol generating strips to a wrapping station;
(ii) supplying the inductively heatable susceptor to the wrapping station;
(iii) wrapping the aerosol generating strips and the inductively heatable susceptor to form a continuous rod.

The method according to the present disclosure facilitates the manufacture of aerosol generating articles and in particular enables aerosol generating articles to be mass produced with relative ease.

The method may further comprise:

(iv) cutting the continuous rod to form a plurality of individual aerosol generating articles.

Step (ii) may comprise positioning the inductively heatable susceptor between the aerosol generating strips. Positioning the inductively heatable susceptor between the aerosol generating strips ensures that effective heating of the aerosol generating strips is achieved.

Step (i) may comprise cutting an aerosol generating sheet to form the aerosol generating strips immediately prior to, or during, positioning an end of the aerosol generating strips in a substantially tubular wrapper formed in step (iii). Manufacture of the aerosol generating article is simplified due to handling of an aerosol generating sheet, rather than multiple aerosol generating strips, until the point at which the aerosol generating strips are positioned in the substantially tubular wrapper.

Step (ii) may comprise holding the inductively heatable susceptor whilst positioning an end of the inductively heatable susceptor in a substantially tubular wrapper formed in step (iii), for example to set the orientation of a major face of the susceptor. With this arrangement, the orientation of the inductively heatable susceptor can be assured. In the case of multiple strip-shaped susceptors for example, a major face of each of the strip-shaped susceptors can be reliably oriented in the same direction, thereby providing an aerosol generating article which has optimum heating and air flow characteristics.

Step (ii) may comprise supplying at least two strip-shaped susceptors to the wrapping station.

In one embodiment, each of the at least two strip-shaped susceptors may be supplied by a different feed unit. This allows the strip-shaped susceptors to be accurately positioned within the aerosol generating article.

In another embodiment, each of the at least two strip-shaped susceptors may be supplied by a common feed unit. The supply of the strip-shaped susceptors to the wrapping station is thereby simplified.

The method may further comprise detecting, after step (iii), the position of the inductively heatable susceptor within the cross-sectional envelope of the continuous rod. The detecting step may be performed using a camera.

The method may further comprise ceasing manufacture and/or adjusting one or more susceptor feed units based on the detected position to obtain a desired position of the inductively heatable susceptor within the cross-sectional envelope of the continuous rod. The position of the inductively heatable susceptor within the cross-sectional envelope of the continuous rod can be adjusted and optimised, for example by repositioning of the one or more susceptor feed units.

BRIEF DESCRIPTION OF THE DRAWINGS

FIGS. 8*a* to 8*c* are diagrammatic views of an apparatus and method for manufacturing the first example of the aerosol generating article shown in FIGS. 1*a* and 1*b*, wherein FIG. 8*a* is a top view and FIG. 8*b* is a side view; and FIGS. 9*a* to 9*c* are diagrammatic views of an apparatus and method for manufacturing an eighth example of an aerosol generating article, wherein FIG. 9*a* is a top view and FIG. 9*b* is a side view.

DETAILED DESCRIPTION OF EMBODIMENTS

Embodiments of the present disclosure will now be described by way of example only and with reference to the accompanying drawings.

Figure 1A:
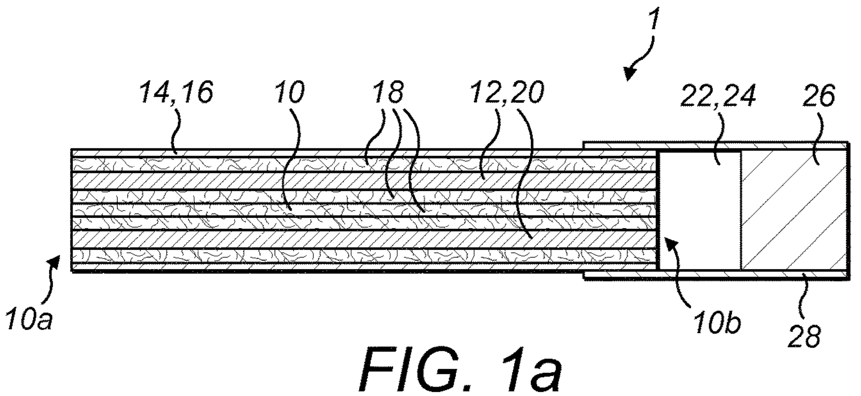
FIGS. 1*a* and 1*b* are diagrammatic cross-sectional side and end views respectively of a first example of an aerosol generating article.
Figure 1B:
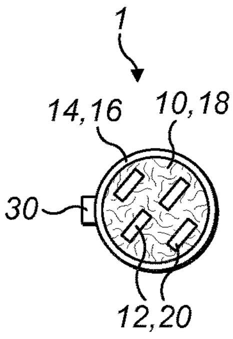

Referring initially to FIGS. 1*a* and 1*b*, there is shown a first example of an aerosol generating article 1 for use with an aerosol generating device that comprises an induction coil and that operates based on the induction heating principle. Such devices are known in the art and will not be described in further detail in this specification. The aerosol generating article 1 is elongate and substantially cylindrical. The circular cross-section facilitates handling of the article 1 by a user and insertion of the article 1 into a cavity or heating compartment of an aerosol generating device.

The aerosol generating article 1 comprises an aerosol generating material part 10 having first and second ends 10*a*, 10*b* and an inductively heatable susceptor 12 which are positioned in, and enclosed by, a shell 14. The shell 14 comprises a material which is substantially non-electrically conductive and non-magnetically permeable. In the illustrated example, the shell 14 comprises a tubular paper wrapper 16.

The aerosol generating material part 10 is substantially rod-shaped comprises at least ten aerosol generating strips 18 which are substantially oriented in a first direction constituted by the longitudinal direction of the aerosol generating article 1. A plurality of gaps (not visible in FIGS. 1*a* and 1*b*) are typically present between the aerosol generating strips 18 and these provide an air flow route through the aerosol generating article 1. The aerosol generating strips 18 are foldless in the longitudinal direction to ensure that the air flow route is not interrupted and that a uniform air flow through the article 1 can be achieved.

The inductively heatable susceptor 12 comprises a plurality of strip-shaped susceptors 20 which, like the aerosol generating strips 18, are substantially oriented in the first direction constituted by the longitudinal direction of the aerosol generating article 1. The strip-shaped susceptors 20 are foldless in the longitudinal direction to prevent hot spots in the aerosol generating material part 10. As will be apparent from FIG. 1*b*, four strip-shaped susceptors 20 are positioned in the shell 14. In practice, any suitable number of strip-shaped susceptors 20 can be positioned in the shell 14, depending on the heating requirements. Each of the strip-shaped susceptors 20 is advantageously surrounded by aerosol generating strips 18 thereby ensuring that heat transfer to the aerosol generating strips 18 is maximised and further ensuring that the strip-shaped susceptors 20 do not contact each other.

In the illustrated first example of the aerosol generating article 1, the tubular wrapper 16, the aerosol generating strips 18 and the strip-shaped susceptors 20 are all substantially the same length and their respective ends are aligned in the longitudinal direction so that they are flush.

The aerosol generating article 1 comprises a vapour cooling region 22 in the form of a hollow chamber 24 positioned downstream of the aerosol generating material part 10. The aerosol generating article 1 also comprises a filter 26, for example comprising cellulose acetate fibres, positioned downstream of the vapour cooling region 22 and through which a user can inhale an aerosol or vapour generated during use of the article 1 in an aerosol generating device. As best seen in FIG. 1*a*, a downstream end of the tubular wrapper 16, the vapour cooling region 22 and the filter 26 are wrapped by a sheet of material, for example a paper wrapper 28 in the form of tipping paper, to assemble the tubular wrapper 16 and the filter 26 and maintain their positional relationship.

The aerosol generating strips 18 typically comprise plant derived material, such as tobacco. The aerosol generating strips 18 advantageously comprise reconstituted tobacco including tobacco and any one or more of cellulose fibres, tobacco stalk fibres and inorganic fillers such as CaCO3.

The aerosol generating strips 18 comprise an aerosol-former such as glycerine or propylene glycol. Typically, the aerosol generating strips 18 comprise an aerosol-former content of between approximately 5% and approximately 50% on a dry weight basis. Upon heating, the aerosol generating strips 18 release volatile compounds possibly including nicotine or flavour compounds such as tobacco flavouring.

When a time varying electromagnetic field is applied in the vicinity of the strip-shaped susceptors 20 during use of the article 1 in an aerosol generating device, heat is generated in the strip-shaped susceptors 20 due to eddy currents and magnetic hysteresis losses and the heat is transferred from the strip-shaped susceptors 20 to the aerosol generating strips 18 to heat the aerosol generating strips 18 without burning them to release one or more volatile compounds and thereby generate a vapour. As a user inhales through the filter 26, the heated vapour is drawn in a downstream direction through the article 1 from the first end 10*a* of the aerosol generating material part 10 and towards the filter 26. As the heated vapour flows through the vapour cooling region 22 towards the filter 26, the heated vapour cools and condenses to form an aerosol with suitable characteristics for inhalation by a user through the filter 26.

In order to ensure that the aerosol generating article 1 is optimally positioned in the cavity or heating compartment of an aerosol generating device with respect to the induction coil, the article 1 includes a projection 30 on its outer surface as best seen in FIG. 1*b*. The projection 30 is locatable in use in a correspondingly shaped recess formed in the housing of an aerosol generating device and ensures that the strip-shaped susceptors 20 are optimally coupled with the electromagnetic field generated by the induction coil.

Figure 2A:
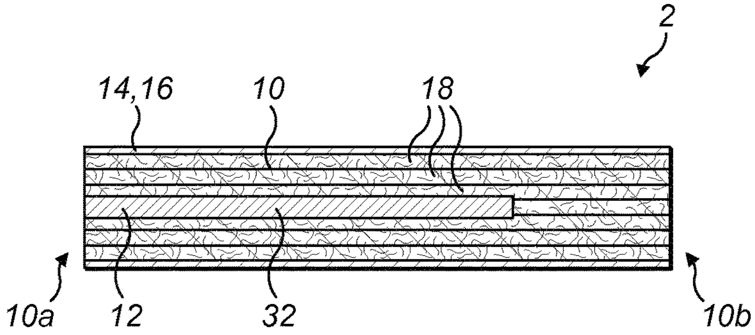
FIGS. 2*a* and 2*b* are diagrammatic cross-sectional side and end views respectively of a second example of an aerosol generating article.
Figure 2B:
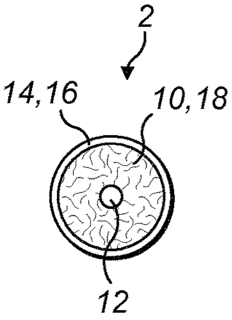

Referring now to FIGS. 2*a* and 2*b*, there is shown a second example of an aerosol generating article 2 which is similar to the aerosol generating article 1 illustrated in FIGS. 1*a* and 1*b* and in which corresponding elements are designated using the same reference numerals.

The aerosol generating article 2 is identical to the aerosol generating article 1 illustrated in FIGS. 1*a* and 1*b* in all respects except that the inductively heatable susceptor 12 is substantially I-shaped or pin-shaped, comprising a single elongate part 32 which is positioned at the centre of the aerosol generating material part 10 to ensure that the aerosol generating strips 20 are uniformly heated.

In the illustrated example, the I-shaped inductively heatable susceptor 12 extends only partially through the aerosol generating material part 10, from the first end 10*a* to an intermediate point between the first and second ends 10*a*, 10*b*. It will, however, be understood by one of ordinary skill in the art that the inductively heatable susceptor 12 could be the same length as the aerosol generating strips 18, extending fully through the aerosol generating material part 10 from the first end 10*a* to the second end 10*b*.

Figure 3A:
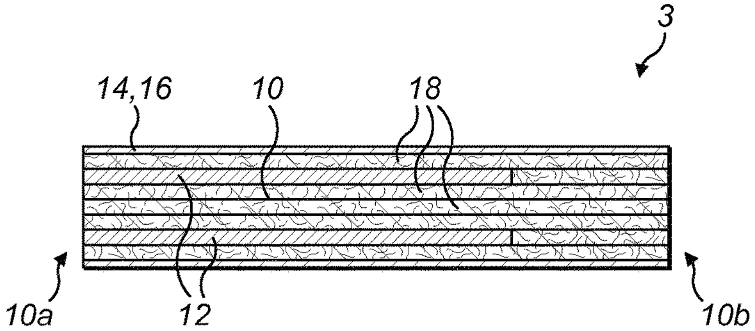
FIGS. 3*a* and 3*b* are diagrammatic cross-sectional side and end views respectively of a third example of an aerosol generating article.
Figure 3B:
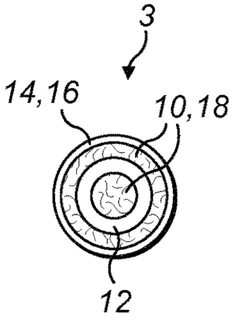

Referring now to FIGS. 3*a* and 3*b*, there is shown a third example of an aerosol generating article 3 which is similar to the aerosol generating article 1 illustrated in FIGS. 1*a* and 1*b* and in which corresponding elements are designated using the same reference numerals.

The aerosol generating article 3 is identical to the aerosol generating article 1 illustrated in FIGS. 1*a* and 1*b* in all respects except that the inductively heatable susceptor 12 is tubular. The aerosol generating strips 18 in the aerosol generating material part 10 are positioned both inside and outside of the tubular inductively heatable susceptor 12 to maximise heat transfer to the aerosol generating strips 18 and to thereby maximise the amount of aerosol that is generated and to maximise energy efficiency.

In preferred embodiments, the tubular inductively heatable susceptor 12 and the tubular wrapper 16 are concentric, thereby ensuring that the aerosol generating strips 18 are uniformly heated.

In the illustrated example, the tubular inductively heatable susceptor 12 extends only partially through the aerosol generating material part 10, from the first end 10*a* to an intermediate point between the first and second ends 10*a*, 10*b*. It will, however, be understood by one of ordinary skill in the art that the tubular inductively heatable susceptor 12 could be the same length as the aerosol generating strips 18, extending fully through the aerosol generating material part 10 from the first end 10*a* to the second end 10*b*.

Figure 4A:
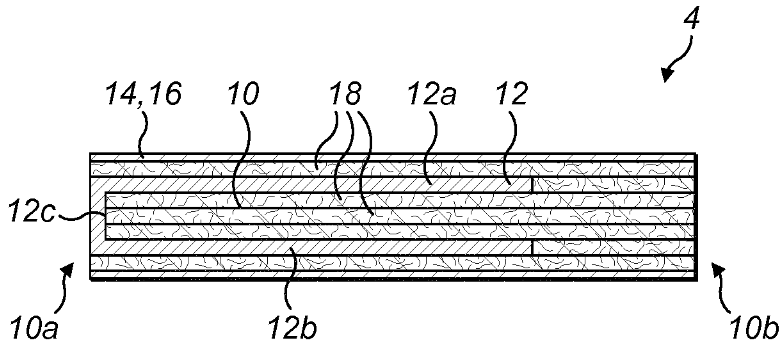
FIGS. 4*a* and 4*b* are diagrammatic cross-sectional side and end views respectively of a fourth example of an aerosol generating article.
Figure 4B:
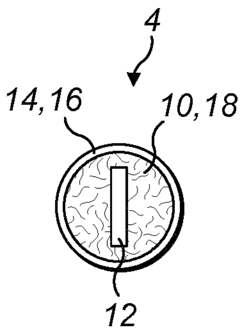

Referring now to FIGS. 4*a* and 4*b*, there is shown a fourth example of an aerosol generating article 4 which is similar to the aerosol generating article 1 illustrated in FIGS. 1*a* and 1*b* and in which corresponding elements are designated using the same reference numerals.

The aerosol generating article 4 is identical to the aerosol generating article 1 illustrated in FIGS. 1*a* and 1*b* in all respects except that the inductively heatable susceptor 12 is substantially U-shaped, comprising two elongate parts 12*a*, 12*b*, which extend partially through the aerosol generating material part 10 from the first end 10*a* to an intermediate point between the first and second ends 10*a*, 10*b*, and a connecting part 12*c* positioned at the first end 10*a* which connects the two elongate parts 12*a*, 12*b*. In the illustrated example, the upstream end of the U-shaped inductively heatable susceptor 12, constituted by the connecting part 12*c*, is embedded in the aerosol generating strips 18 at the first end 10*a* of the aerosol generating material part 10 so that the inductively heatable susceptor 12 is fully surrounded by the aerosol generating strips 18.

Again, it will be understood by one of ordinary skill in the art that the elongate parts 12*a*, 12*b* of the U-shaped inductively heatable susceptor 12 could be the same length as the aerosol generating strips 18 and extend fully through the aerosol generating material part 10 from the first end 10*a* to the second end 10*b*.

Figure 5A:
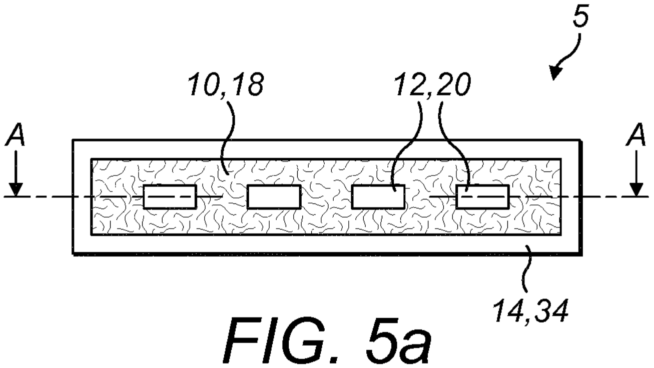
FIG. 5*a* is a diagrammatic cross-sectional end view of a fifth example of an aerosol generating article.
Figure 5B:
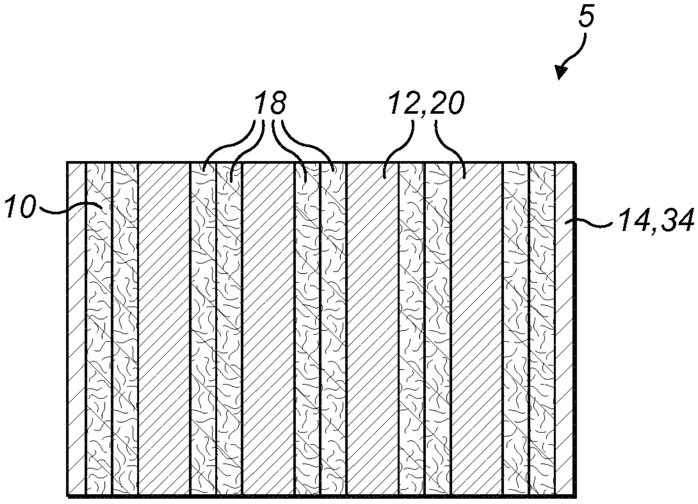
FIG. 5*b* is a cross-sectional view along the line A-A in FIG. 5*a;*

Referring now to FIGS. 5*a* and 5*b*, there is shown a fifth example of an aerosol generating article 5 which is similar to the aerosol generating article 1 illustrated in FIGS. 1*a* and 1*b* and in which corresponding elements are designated using the same reference numerals.

The aerosol generating article 5 comprises a shell 14 in the form of a tube 34 having a rectangular cross-section and comprising a heat-resistant plastics material such as polyether ether ketone (PEEK). The plastics tube 34 is open at both ends and encloses a plurality of aerosol generating strips 18 and strip-shaped susceptors 20 oriented in the longitudinal direction of the article 5.

Figure 6A:
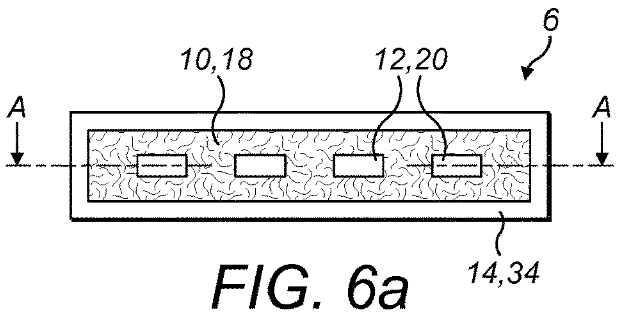
FIG. 6*a* is a diagrammatic cross-sectional end view of a sixth example of an aerosol generating article.
Figure 6B:
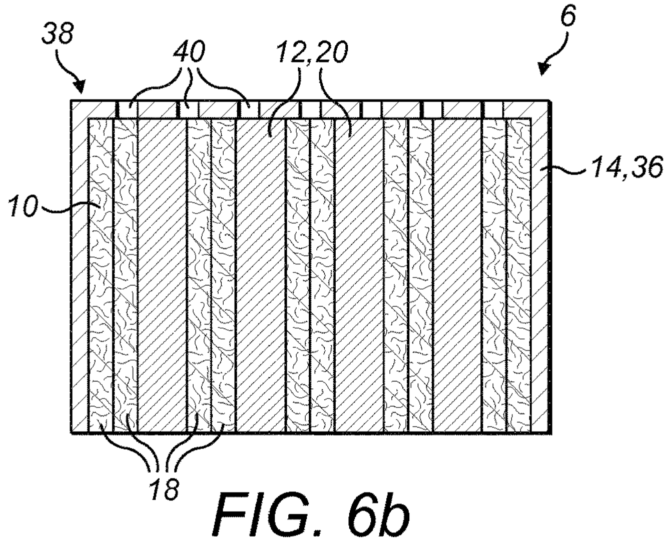
FIG. 6*b* is a cross-sectional view along the line A-A in FIG. 6*a;*

Referring now to FIGS. 6*a* and 6*b*, there is shown a sixth example of an aerosol generating article 6 which is similar to the aerosol generating article 5 illustrated in FIGS. 5*a* and 5*b* and in which corresponding elements are designated using the same reference numerals.

The aerosol generating article 6 comprises a shell 14 in the form of a cup 36 having a rectangular cross-section and comprising a plastics material. The plastics cup 36 encloses a plurality of aerosol generating strips 18 and strip-shaped susceptors 20 oriented in the longitudinal direction of the article 6.

The plastics cup 36 has a closed end 38 and includes a plurality of openings 40 at the closed end 38 which allow air to flow into the aerosol generating material part 10. The openings 40 are typically uniformly distributed to ensure that a uniform air flow is obtained through the aerosol generating material part 10 during use of the aerosol generating article 6 in an aerosol generating device.

Figure 7A:
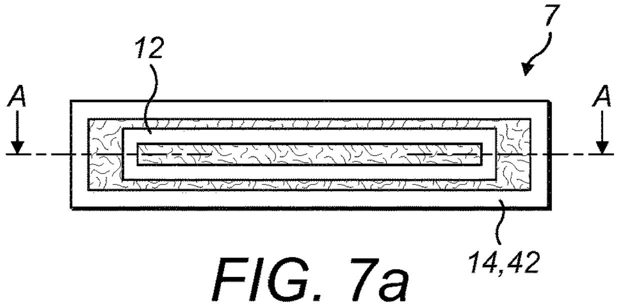
FIG. 7*a* is a diagrammatic cross-sectional end view of a seventh example of an aerosol generating article.
Figure 7B:
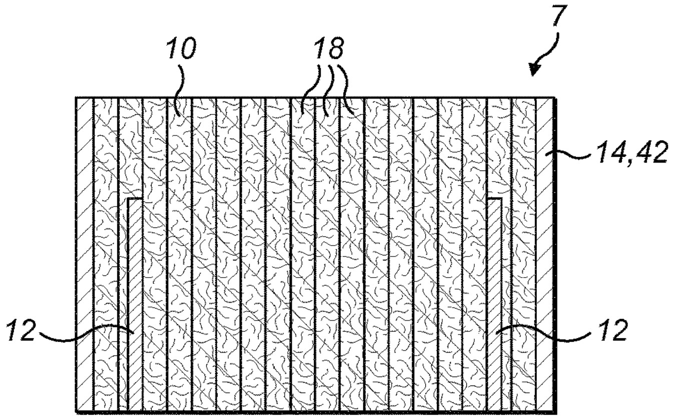
FIG. 7*b* is a cross-sectional view along the line A-A in FIG. 7*a;*

Referring now to FIGS. 7*a* and 7*b*, there is shown a seventh example of an aerosol generating article 7 which is similar to the aerosol generating article 5 illustrated in FIGS. 5*a* and 5*b* and in which corresponding elements are designated using the same reference numerals.

The aerosol generating article 7 comprises a shell 14 in the form of a tube 42 having a rectangular cross-section and comprising a plastics material or paper. The tube 42 is open at both ends encloses a plurality of aerosol generating strips 18 oriented in the longitudinal direction of the article 7. In this example, the inductively heatable susceptor 12 is tubular and has a rectangular cross-sectional shape which corresponds to the cross-sectional shape of the tube 42. It will, therefore, be appreciated that the major faces of the susceptor 12 are oriented in a second direction which is substantially orthogonal to the longitudinal direction (i.e. the first direction) of the article 7 in which the aerosol generating strips 18 are oriented, thereby ensuring optimal coupling with the electromagnetic field generated by an induction coil of an aerosol generating device.

Apparatus 50, 80 and methods suitable for manufacturing aerosol generating articles according to the present disclosure, such as the aerosol generating article 1 described above with reference to FIGS. 1*a* and 1*b*, will now be described.

Figure 8A:
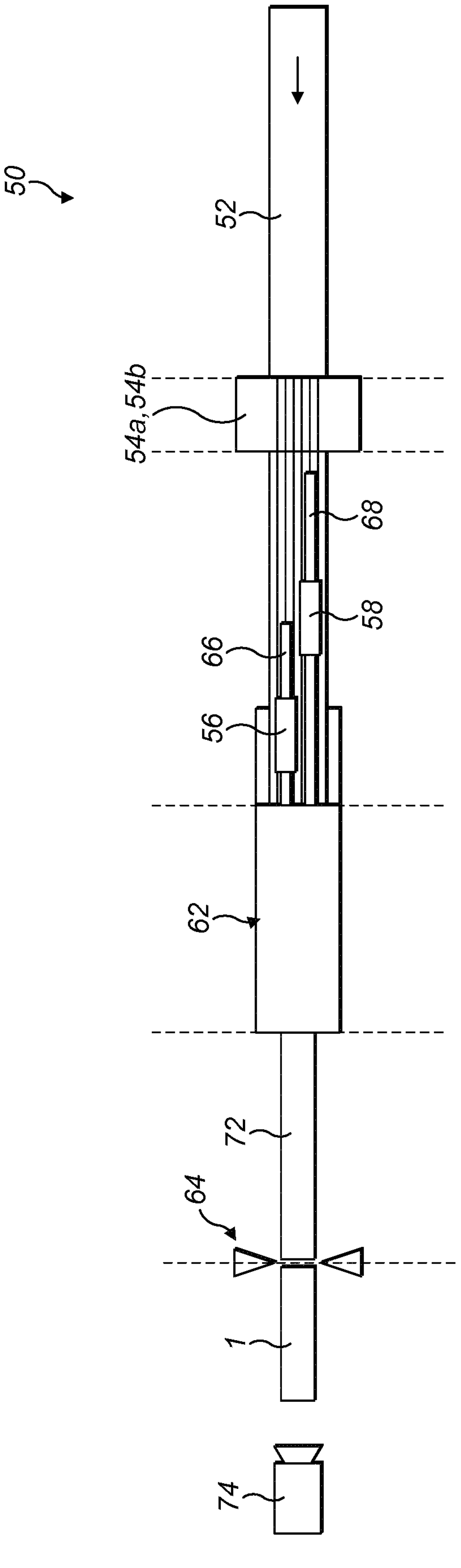
Figure 8B:
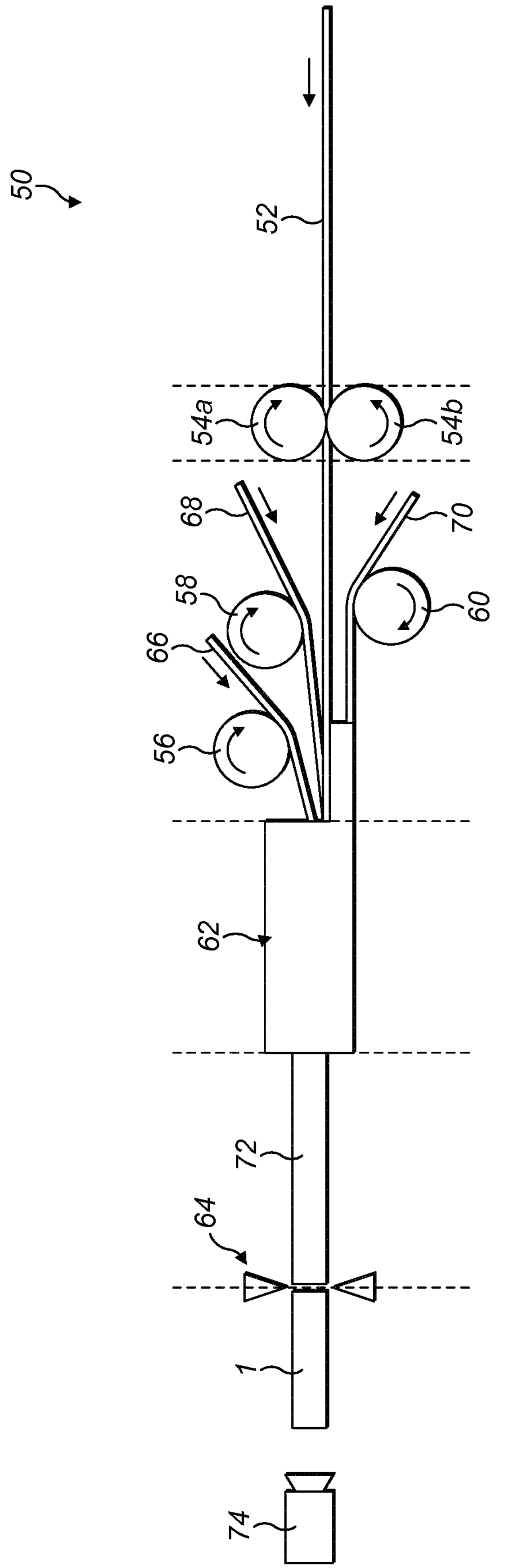
Figure 8C:
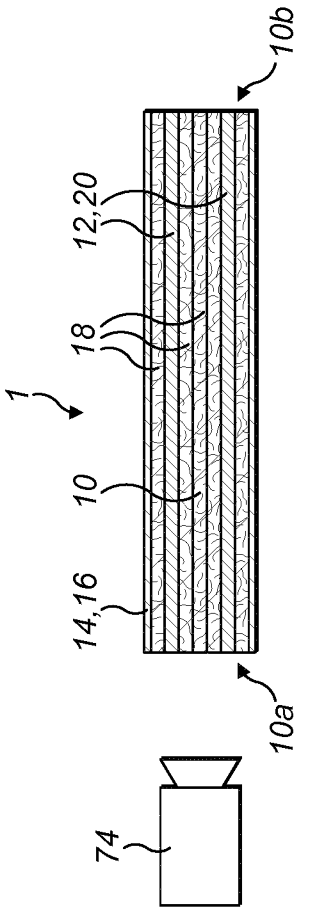

Referring to FIGS. 8*a* to 8*c*, there is shown a diagrammatic illustration of an apparatus 50 and method for manufacturing the first example of the aerosol generating article 1 described above with reference to FIGS. 1*a* and 1*b*.

The apparatus 50 comprises a supply reel (not shown) carrying an aerosol generating sheet 52 in continuous sheet form, cutting rollers 54*a*, 54*b*, susceptor feed units in the form of susceptor feed rollers 56, 58, and a feed roller 60 for supplying a sheet of wrapping paper 70. The apparatus further includes a wrapping station 62 and a cutting station 64.

In operation, an aerosol generating sheet 52 is continuously supplied from the supply reel to the cutting rollers 54*a*, 54*b*. The cutting rollers 54*a*, 54*b* include cutting formations which cooperate to cut the aerosol generating sheet 52 into a plurality of continuous aerosol generating strips 18 which are supplied to the wrapping station 62. At the same time, the susceptor feed rollers 56, 58 continuously supply first and second continuous strips 66, 68 of inductively heatable susceptor 12 to the wrapping station 62 from supply reels (not shown).

A continuous sheet 70 of wrapping paper is supplied to the wrapping station 62 by the feed roller 60 from a supply reel (not shown). As the sheet 70 of wrapping paper is transported and guided through the wrapping station 62, it is wrapped around the continuous aerosol generating strips 18 and the first and second continuous strips 66, 68 of inductively heatable susceptor 12 so that it forms a continuous rod 72.

The continuous rod 72 is then transported to the cutting station 64 where it is cut at appropriate positions into predetermined lengths to form multiple aerosol generating articles 1. The continuous aerosol generating strips 18, the first and second continuous strips 66, 68 of inductively heatable susceptor 12 and the continuous tubular wrapper 16 are all cut to the same length at the cutting station 64 to form the individual aerosol generating articles 1. It will be understood that this type of method is suitable for the mass production of aerosol generating articles 1.

The apparatus 50 further includes a camera 74 which detects the position of the strip-shaped susceptors 20 within the cross-sectional envelope of the continuous rod 72 that is cut to form the aerosol generating articles 1. If the position of the strip-shaped susceptors 20 detected by the camera 74 is not optimal, the position of the susceptor feed rollers 56, 58 may be adjusted, for example manually or automatically, based on the detected position to ensure that the strip-shaped susceptors 20 are optimally positioned. The apparatus 50 may cease manufacture of the aerosol generating articles 1 whilst the repositioning of the susceptor feed rollers 56, 58 takes place or the apparatus 50 may alternatively continue to manufacture the aerosol generating articles 1 whilst the repositioning of the susceptor feed rollers 56, 58 takes place.

In a variation of the apparatus 50 and method, the susceptor feed rollers 56, 58 may continuously supply discrete and pre-cut strip-shaped susceptors 20 to the wrapping station 62 instead of continuous strips 66, 68 of inductively heatable susceptor 12 as described above. In this case, the susceptor feed rollers 56, 58 are adapted to hold one end of the respective strip-shaped susceptors 20 whilst an opposite end is suitably positioned in the wrapping station 62.

Figure 9A:
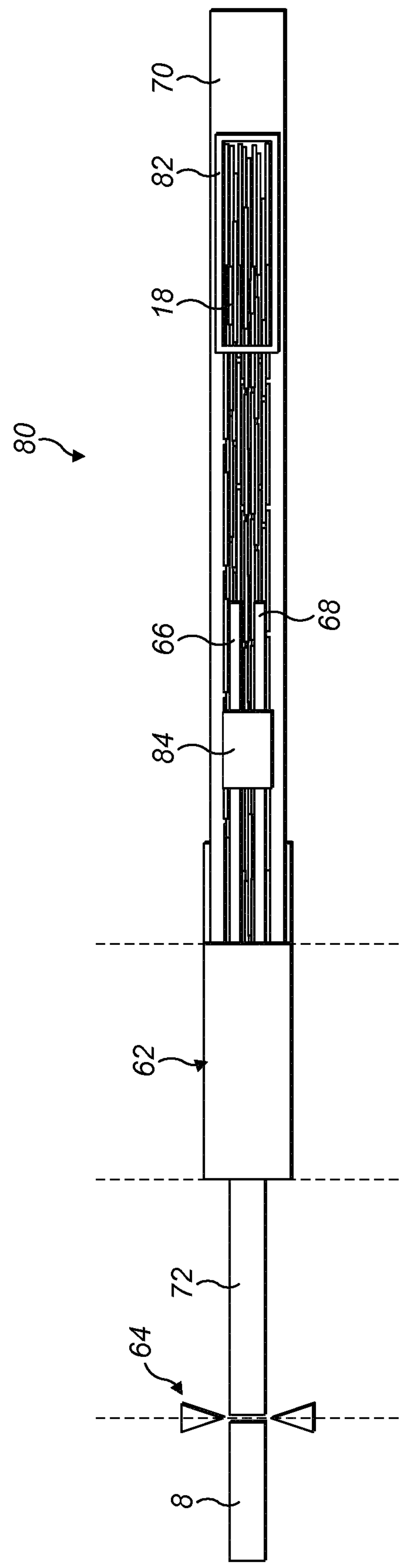
Figure 9B:
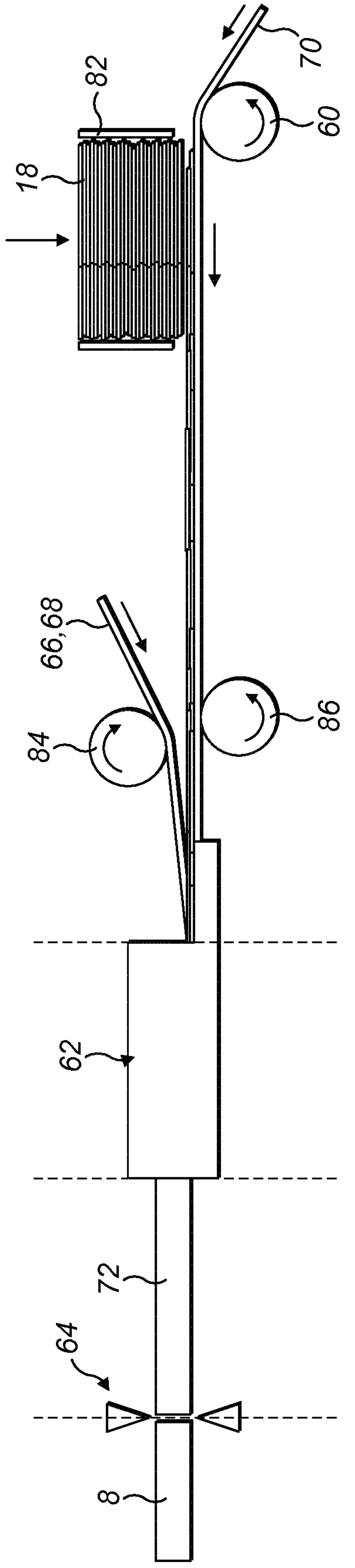
Figure 9C:
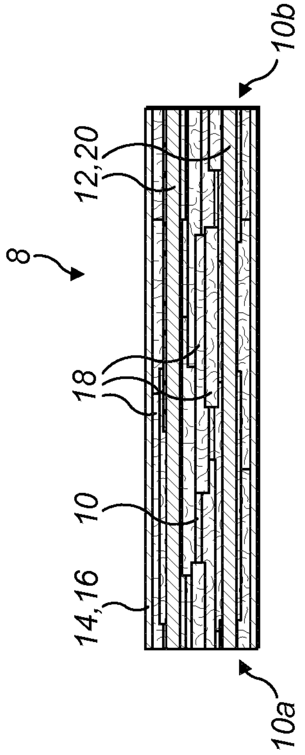

Referring now to FIGS. 9*a* to 9*c*, there is shown an example of an apparatus 80 and method for manufacturing an eighth example of an aerosol generating article 8 illustrated in FIG. 9*c*. Certain elements of the apparatus 80 and method are similar to the apparatus 50 and method described above with reference to FIGS. 8*a* to 8*c* and are, therefore, designated using the same reference numerals.

The apparatus 80 includes feed rollers 60, 86 for supplying a continuous sheet 70 of wrapping paper to a wrapping station 62 from a supply reel (not shown). The apparatus 80 further includes a hopper 82 which contains a supply of aerosol generating strips 18, possibly of varying lengths. In operation, the aerosol generating strips 18 stored in the hopper 82 are randomly positioned on an upper surface of the continuous sheet 70 of wrapping paper as it is transported by the feed rollers 60, 86 to the wrapping station 62. With this arrangement, it will be understood that the aerosol generating strips 18 may overlap in their longitudinal direction as illustrated diagrammatically in FIGS. 9*a* to 9*c*.

A susceptor feed unit in the form of a susceptor feed roller 84 continuously supplies first and second continuous strips 66, 68 of inductively heatable susceptor 12 to the wrapping station 62 from supply reels (not shown).

As the sheet 70 of wrapping paper is transported and guided through the wrapping station 62, it is wrapped around the aerosol generating strips 18 and the first and second continuous strips 66, 68 of inductively heatable susceptor 12 so that it forms a continuous rod 72.

The continuous rod 72 is then transported to the cutting station 64 where it is cut at appropriate positions into predetermined lengths to form multiple aerosol generating articles 8. Some of the aerosol generating strips 18 may be cut at the cutting station 64 depending on their position within the continuous rod 72, whilst the first and second continuous strips 66, 68 of inductively heatable susceptor 12 and the continuous tubular wrapper 16 are cut to the same length at the cutting station 64 to form the individual aerosol generating articles 8. It will again be understood that this type of method is suitable for the mass production of aerosol generating articles 8.

In a variation of the apparatus 80 and method, the susceptor feed roller 84 may continuously supply discrete and pre-cut strip-shaped susceptors 20 to the wrapping station 62 instead of continuous strips 66, 68 of inductively heatable susceptor 12 as described above. In this case, the susceptor feed roller 84 is adapted to hold one end of the respective strip-shaped susceptors 20 whilst an opposite end is suitably positioned in the wrapping station 62.

In a further variation of the apparatus 80 and method, the apparatus 80 may include a further hopper (not shown) positioned downstream of the hopper 82 and containing a supply of strip-shaped susceptors 20. The further hopper may be adapted to position the strip-shaped susceptors 20 on the upper surface of the sheet 70 of wrapping paper, and more particularly onto the aerosol generating strips 18 deposited on the upper surface of the sheet 70 of wrapping paper from the hopper. In this case, it will be understood that the susceptor feed roller 84 is not needed.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An aerosol generating article comprising:
- a shell;
- a filter; and
- an aerosol generating material part and an inductively heatable susceptor positioned in the shell, wherein:
- the aerosol generating material part comprises at least ten aerosol generating strips substantially oriented in a first direction, the aerosol generating material part having a density of the at least ten aerosol generating strips that is substantially uniform along the first direction; and
- the inductively heatable susceptor is positioned between the aerosol generating strips, and comprises an elongate part which is substantially oriented in the first direction.

2. The aerosol generating article according to claim 1, wherein the inductively heatable susceptor is strip-shaped and substantially oriented in the first direction.

3. The aerosol generating article according to claim 1, wherein the aerosol generating material part is rod-shaped, the shell comprises a substantially tubular wrapper, and the rod-shaped aerosol generating material part and the inductively heatable susceptor are enclosed by the substantially tubular wrapper.

4. The aerosol generating article according to claim 3, wherein at least some of the aerosol generating strips have a length which is less than the length of the tubular wrapper.

5. The aerosol generating article according to claim 1, wherein the aerosol generating article comprises at least two strip-shaped inductively heatable susceptors.

6. The aerosol generating article according to claim 5, wherein a major face of each of the at least two strip-shaped susceptors is substantially oriented in a second direction which is substantially orthogonal to the first direction.

7. The aerosol generating article according to claim 5, wherein at least one of said aerosol generating strips is positioned between the at least two strip-shaped susceptors.

8. The aerosol generating article according to claim 5, wherein the at least two strip-shaped susceptors are surrounded by the aerosol generating strips.

9. The aerosol generating article according to claim 1, wherein the aerosol generating strips are foldless.

10. A method for continuously manufacturing the aerosol generating article according to claim 1, comprising:

(i) supplying at least ten aerosol generating strips to a wrapping station;

(ii) supplying the inductively heatable susceptor to the wrapping station; and (iii) wrapping the aerosol generating strips and the inductively heatable susceptor to form a continuous rod.

11. The method according to claim 10, wherein step (ii) comprises positioning the inductively heatable susceptor between the aerosol generating strips.

12. The method according to claim 10, wherein step (i) comprises cutting an aerosol generating sheet to form the aerosol generating strips immediately prior to, or during, positioning an end of the aerosol generating strips in a substantially tubular wrapper formed in step (iii).

13. The method according to claim 10, wherein step (ii) comprises holding the inductively heatable susceptor whilst positioning an end of the inductively heatable susceptor in a substantially tubular wrapper formed in step (iii).

14. The method according to claim 10, wherein step (ii) comprises supplying at least two strip-shaped susceptors to the wrapping station; and either:

(a) each of the at least two strip-shaped susceptors is supplied by a different feed unit; or (b) each of the at least two strip-shaped susceptors is supplied by a common feed unit.

15. The method according to claim 10, further comprising detecting, after step (iii), the position of the inductively heatable susceptor within the cross-sectional envelope of the continuous rod.

16. The method according to claim 15, further comprising ceasing manufacture and/or adjusting one or more susceptor feed units based on the detected position to obtain a desired position of the inductively heatable susceptor within the cross-sectional envelope of the continuous rod.

17. An aerosol generating article comprising:

a shell;

a filter; and an aerosol generating material part and an inductively heatable susceptor positioned in the shell, wherein:

the aerosol generating material part comprises at least ten aerosol generating strips substantially oriented in a first direction; and the inductively heatable susceptor is positioned between the aerosol generating strips, and comprises an elongate part which is substantially oriented in the first direction, wherein an end of the shell encloses the inductively heatable susceptor and the at least ten aerosol generating strips.

18. The aerosol generating article according to claim 17, wherein the end of the shell includes a plurality of holes, so as to allow airflow.

19. The aerosol generating article according to claim 17, further comprising a paper wrapper coupling the filter to the shell.

20. The aerosol generating article according to claim 19, wherein the inductively heatable susceptor is a U-shape or I-shape.

* * * * *